United States Patent [19]

Davidson

[11] Patent Number: 4,478,316

[45] Date of Patent: Oct. 23, 1984

[54] SLACK ADJUSTER FOR A DISC BRAKE

[75] Inventor: Donald J. Davidson, Troy, Mich.

[73] Assignee: Rockwell International Corporation, Pittsburgh, Pa.

[21] Appl. No.: 484,025

[22] Filed: Apr. 11, 1983

[51] Int. Cl.³ .............................................. F16D 65/56
[52] U.S. Cl. .............................. 188/71.9; 188/196 BA
[58] Field of Search .................... 188/71.8, 71.9, 72.8, 188/79.5 K, 196 D, 196 M, 196 BA

[56] References Cited

U.S. PATENT DOCUMENTS

| | | | |
|---|---|---|---|
| 4,374,551 | 2/1983 | Birkenbach et al. | 188/71.9 |
| 4,399,894 | 8/1983 | Tribe | 188/71.9 |

FOREIGN PATENT DOCUMENTS

| | | | |
|---|---|---|---|
| 1180137 | 2/1970 | United Kingdom | 188/71.9 |

Primary Examiner—Duane A. Reger

[57] ABSTRACT

A slack adjuster is for a disc brake of the type which includes a disc mounted for rotation about an axle and a caliper brake having a housing mounted on the axle in alignment with a friction surface of the disc. A braking piston is mounted in the housing for axial movement toward and away from the friction surface of the disc. Brake actuation produces rotation of a powershaft mounted in the housing which will in turn produce a corresponding axial movement of the braking piston through a non-rotating powershaft nut. An adjusting sleeve between the piston and the powershaft nut is threadably coupled to the piston and capable of rotation in a first direction relative thereto to adjust the axial position of the piston toward the disc. A clearance sensing ring is mounted about the adjusting sleeve for axial movement therewith and has an angled groove in its outer surface for receipt therein of a cam pin which is secured to the housing. The angled groove has opposite parallel walls with an axial distance therebetween equal to an axial thickness of the pin plus a predetermined maximum distance corresponding to the desired running clearance for the piston. Camming between the groove and the pin will cause rotation of the clearance sensing ring in the first direction when the axial movement of the adjusting sleeve toward the disc exceeds the predetermined maximum distance and in an opposite direction when the axial movement of the adjusting sleeve away from the disc exceeds the predetermined maximum distance. A clutch element is mounted on the adjusting sleeve with the clearance sensing ring mounted thereon to produce corresponding rotation of the adjusting sleeve in the first direction until the piston contacts the friction surface of the disc and to prevent corresponding rotation of the adjusting sleeve in the second direction.

4 Claims, 4 Drawing Figures

SLACK ADJUSTER FOR A DISC BRAKE

BACKGROUND OF THE INVENTION

1. Field of the Invention

This invention relates to a slack adjuster for a disc brake and, more specifically, to such a slack adjuster which utilizes an adjusting sleeve threadably coupled to the brake piston for rotation relative thereto to adjust the axial position of the piston.

2. Description of the Prior Art

One type of disc brake which is well known in the automotive field utilizes a rotating disc or rotor which is mounted for rotation with a wheel. The brake includes a caliper assembly which is mounted on the axle with an extended, outboard portion which overlies the outboard side of the disc and a piston which is aligned with the inboard side of the disc. Axial movement of the piston causes the disc to be entrapped therebetween to produce a frictional force thereon tending to prevent rotation of the disc and wheel.

Both the extended portion and the piston employ brake shoe and friction pad configurations with the friction pads being made of a material which is worn away during the life of the brake as the surface thereon is repeatedly brought into frictional contact with the disc. However, during normal actuation of the brake, it is desirable for the piston to be maintained at a predetermined running clearance from the disc so that application of the brake will be assured after the piston has traveled through the relatively small, predetermined running clearance. With repeated use and extensive wear of the friction pads, it would be possible for the piston to remain at the same position relative to the disc prior to actuation to cause the running clearance to be enlarged sufficiently to prevent quick, reliable brake operation. Such extensive piston movement during actuation could complicate the operation of the actuation means and lengthen the time required to initially apply the brakes. Accordingly, it is not uncommon to employ a slack adjusting means within such a brake which is intended to insure that the running clearance will be maintained within a maximum distance throughout the life of the friction pads to insure that the brake will quickly produce frictional contact with the disc whenever the brake is being actuated.

Although there have heretofore been provided a number of slack adjuster means for insuring that the desired running clearance will be maintained throughout the operating life of such brakes, there remains a need for any slack adjuster which is reliable, effective and relatively simple to maintain.

SUMMARY OF THE INVENTION

It is an object of this invention to provide a slack adjuster for a disc brake which is effective, reliable and relatively simple to maintain.

These and other objects of the invention are provided in a preferred embodiment thereof including a slack adjuster for a disc brake of the type which includes a disc mounted for rotation about an axle and a brake housing mounted on the axle in alignment with a friction surface of the disc. A non-rotatable braking piston is mounted in the housing for axial movement toward and away from the friction surface of the disc. Brake actuation means is mounted on the housing. A powershaft is mounted within the housing, is coaxially aligned with the piston and is capable of selective rotation by the brake actuation means. The powershaft has worm gear teeth thereon engaged with a powershaft nut within the housing which powershaft nut is prevented from rotating and is capable of axial movement directly corresponding to the selective rotation of the powershaft. The powershaft nut is operably connected to the piston to produce the axial movement thereof toward and away from the friction surface of the disc. A slack adjuster is utilized to maintain a running clearance between the piston and the friction surface of the disc at a predetermined maximum distance when the actuation means is not being actuated. The slack adjuster includes an adjusting sleeve threadably coupled to the piston and capable of rotation relative to the piston to adjust the axial position of the piston relative thereto. The adjusting sleeve is rotated in a first direction to cause the piston to be adjusted toward the disc. The adjusting sleeve is biased away from the disc to cause a rearward end thereof remote from the disc to be maintained in contact with a forward end of the powershaft nut to produce the axial movement thereof corresponding to the axial movement of the powershaft nut. A clearance sensing ring is mounted about the adjusting sleeve for axial movement therewith. Camming means is provided between the clearance sensing ring and the housing to cause the clearance sensing ring to rotate in a first direction when the axial movement of the adjusting sleeve toward the disc exceeds the predetermined maximum distance and in a second direction opposite from the first direction when the axial movement of the adjusting sleeve away from the disc exceeds the predetermined maximum distance. Clutch means is provided between the clearance sensing ring and the adjusting sleeve to produce the corresponding rotation of the adjusting sleeve in the first direction until the piston contacts the friction surface of the disc to provide a braking force thereto and to prevent corresponding rotation of the adjusting sleeve in the second direction.

DETAILED DESCRIPTION OF THE PREFERRED EMBODIMENT

Figure 1:
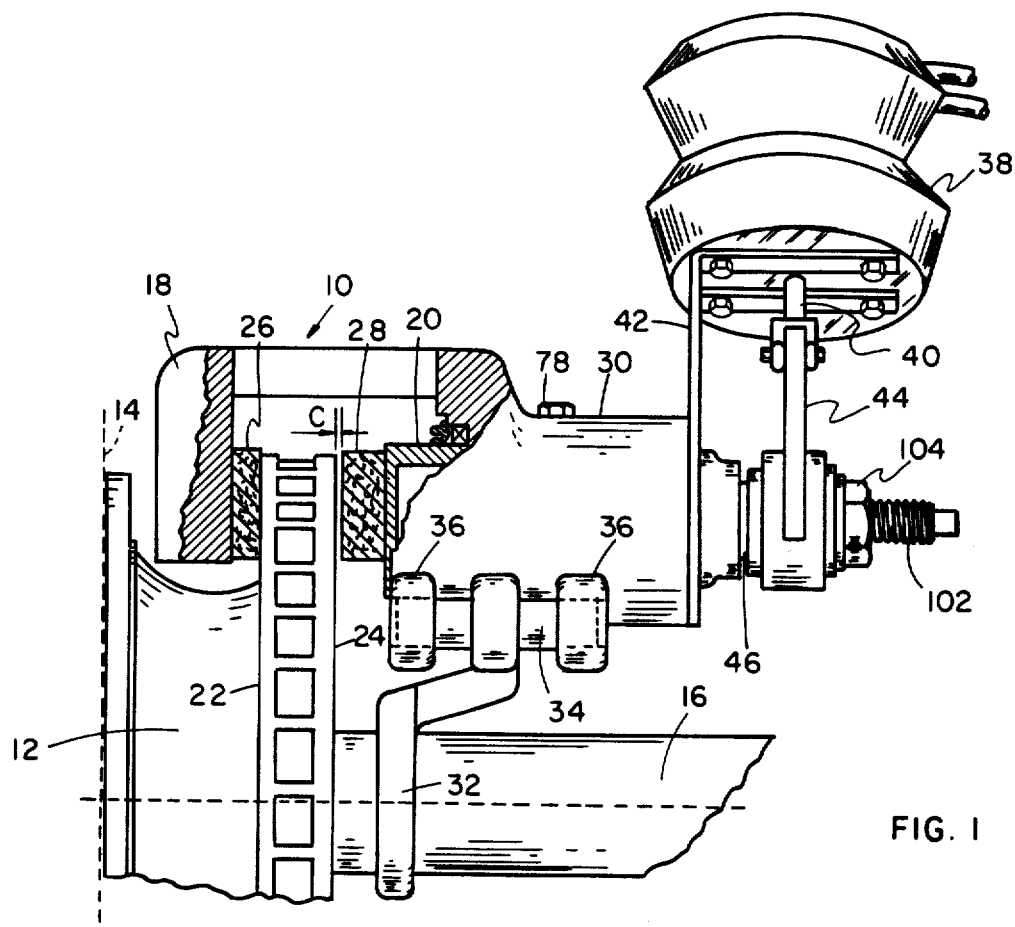
FIG. 1 is a fragmentary, elevational view, partially in section, of a typical, simplified caliper brake assembly utilizing the preferred slack adjuster.

As seen in FIG. 1, a typical caliper disc brake 10 utilizes a disc or rotor 12 which is rigidly mounted on a wheel 14 or the like. The wheel 14 is mounted for rotation about an axle 16 which could be a trailer axle or a drive axle for a truck or tractor. The caliper brake 10 includes an extended portion 18 and a non-rotating, axially movable braking piston 20 which are respectively aligned with an outboard friction surface 22 and an inboard friction surface 24 of the disc or rotor 12. Both the extended portion 18 and the movable piston 20 respectively employ shoes and friction pads 26 and 28 to produce frictional contact with the opposite sides of the disc 12.

Although only the piston 20 is intended to move within a housing 30 of the caliper brake 10, the method used to produce movement of the piston 20 and to mount the brake 10 on the axle 16 insures that a braking force is applied to the opposite sides of the disc 12. Specifically, the housing 30 of the brake 10 is mounted on a torque plate 32 which is rigidly secured to the axle 16. The torque plate 32 includes a pair (only one shown in FIG. 1) of caliper slide pins 34 which are each rigidly supported at an intermediate portion thereof with its opposite ends extending axially therefrom. At each side of the housing 30, a pair of axially spaced supports 36 are provided co-axially aligned holes therethrough for receipt of the opposite ends of the caliper slide pin 34 therein. Accordingly, the entire housing 30 of the brake 10 is capable of moving axially relative to the axle 16 and the disc 12.

To produce the axial movement of the brake piston 20, a preferred brake actuation means includes an air chamber 38 which has an actuation rod 40 extending therefrom. The air chamber 38 is rigidly mounted to the housing 30 by a bracket 42 for movement therewith. The actuation rod 40 is coupled to an actuation arm 44 so that inward and outward movement of the rod 40 will produce rotating movement of the arm 44. The actuation arm 44 is secured to a powershaft 46 and it will be seen that rotation of the powershaft 46 will produce corresponding axial movement of the piston 20.

Accordingly, as the brake 10 is being actuated, the actuation rod 40 will produce rotating movement of the actuation arm 44 and outward movement of the piston 20 until the friction pad 28 thereon is brought into contact with the inboard surface 24 of disc 12. If the friction pad 26 on the extended portion 18 is not in contact with the outboard surface 22 of the disc 12, continued movement of piston 20 will cause the entire housing 30 to be moved axially on the caliper slide pins 34 until both friction pads 26 and 28 apply a compressive force on the disc 12 to produce the desired braking friction at both sides thereof. Although exaggerated for the purposes of demonstration and shown at only one side of the disc 12, a normal, predetermined running clearance C is desired to insure that only minimal axial movement of the piston 20 is required to insure that there is full braking force being applied to the disc 12. Obviously, as the usable material of the friction pads 26 and 28 begins to wear away, there is a concern that the running clearance C will be enlarged to a degree which will interfere with quick, reliable braking operation. In the extreme, if the clearance between the friction pads 26 and 28 and the disc 12 were to be quite large, the angle of rotation required for corresponding movement of the actuation arm 44 would be too great for proper operation of the air chamber 38 and actuation rod 40. In fact, there are some prior art slack adjusting means which operate in the actuation arm area and are intended to relocate the arm 44 relative to the powershaft 46 during the operational life of the brake 10. However, in the slack adjuster of the present invention, the adjustment required during the effective life of the brake 10 occurs internally so that a slack adjusting element on the actuation arm is unnecessary and the less complicated actuation arm 44 is all that is required.

Figure 2:
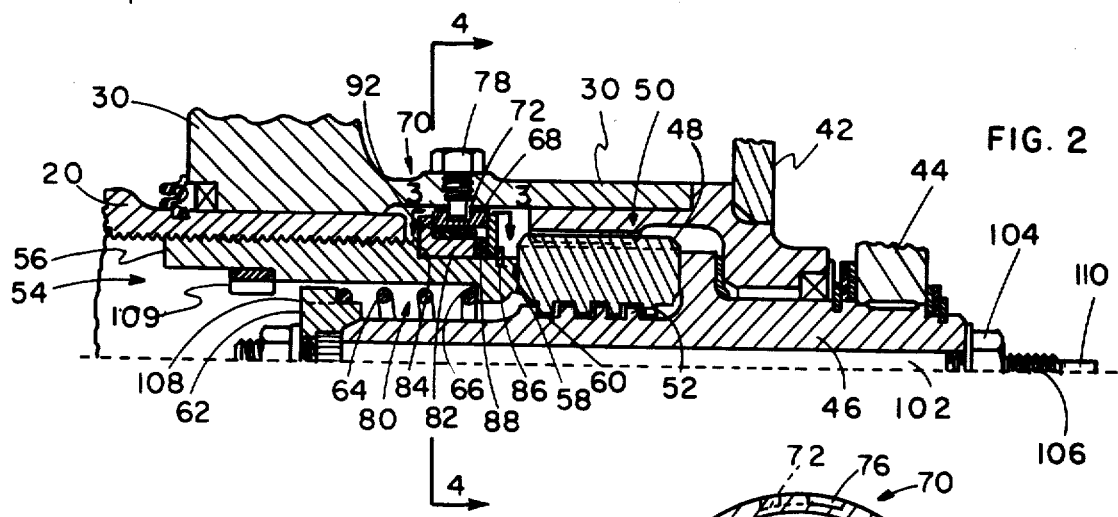
FIG. 2 is a fragmentary, sectional view of the preferred slack adjuster including various features of the invention.

As seen in FIG. 2, the powershaft 46 is mounted for rotation within the housing 30 and is coaxially aligned with the piston 20. With the actuation arm 44 splined to the powershaft 46, it is capable of being selectively rotated within the housing 30. To convert the rotational movement to axial movement as required for applying the braking force with the piston 20, a powershaft nut 48 is mounted within the housing and is capable of axial movement therein but prevented from rotation by being keyed or splined to the housing 30 as at 50. Worm gear teeth 52 on the powershaft 46 engage with matching internal teeth of the powershaft nut 48 and insure that the powershaft nut 48 will move axially in direct correspondence to the selective rotation of the powershaft 46.

As seen in FIG. 2, the brake is in a non-actuated position with the actuation rod 40 fully retracted within the air chamber 38. In this position, the powershaft nut 48 is fully withdrawn from the disc 12 to be located against further movement to the right. During actuation of the brake, the powershaft 46 would be rotated clockwise, when viewed from the left, and the powershaft nut 48 would be moved axially to the left toward the disc 12. As thus described, the brake 10 includes a means for actuation which is well known in the prior art if the piston 20 were directly coupled to the powershaft nut 48 for corresponding movement therewith.

However, in the preferred embodiment, a slack adjuster 54 is operably employed between the powershaft nut 48 and the piston 20 to maintain the running clearance C as described above at a predetermined maximum distance when the brake is not being actuated. The slack adjuster 54 includes an adjusting sleeve 56 which is threadably coupled to the piston 20 and capable of rotating relative to the piston 20 to adjust the axial position of the piston 20 relative thereto. The adjusting sleeve 56 and piston 20 include threads thereon which are arranged to insure that when the adjusting sleeve 56 is rotated in a clockwise direction when viewed from the left, the piston 20 will be adjusted to the left toward the disc 12. To insure that the adjusting sleeve 56 and the piston 20 move axially in response to the axial movement of the powershaft nut 48, there is provided means for biasing the adjusting sleeve 56 away from the disc 12 to cause a rearward end 58 thereof remote from the disc 12 to be maintained in contact with a forward end 60 of the powershaft nut 48. Specifically, an extended end portion 62 of the powershaft 46 supports a spring 64 which acts against an interior surface 66 of the adjusting sleeve 56 to apply a force to the right throughout brake operation.

Figure 3:
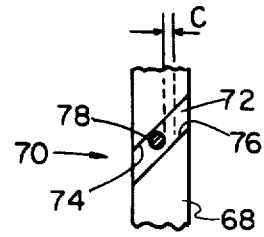
FIG. 3 is a view as seen along line 3—3 of FIG. 2.
Figure 4:
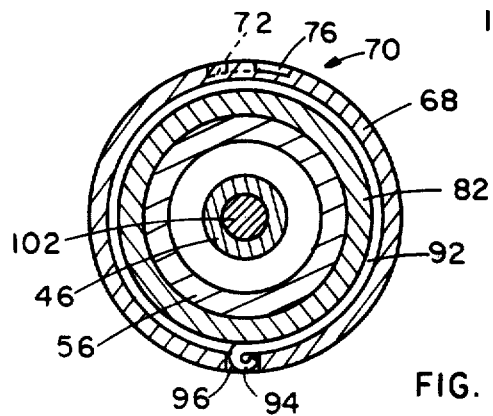
FIG. 4 is a view as seen along line 4—4 of FIG. 2.

To sense the movement of the adjusting sleeve 56 and piston 20 in order to determine if the predetermined maximum distance is exceeded, a clearance sensing ring 68 is mounted about the adjusting sleeve 56 for axial movement therewith in a manner which will be discussed in detail hereinbelow. As seen in FIGS. 2, 3 and 4, camming means 70 is provided between the clearance sensing ring 68 and the housing 30. Specifically, the preferred camming means 70 is intended to cause the clearance sensing ring 68 to rotate in a clockwise direction, when viewed from the left in FIG. 2, when the axial movement of the adjusting sleeve 56 toward the disc 12 exceeds the predetermined maximum distance and in a counter-clockwise direction when the axial movement of the adjusting sleeve 56 away from the disc 12 exceeds the predetermined maximum distance.

The preferred camming means 70 includes an angled groove 72 in an outer surface of the clearance sensing ring 68, which angled groove 72 is defined by a pair of parallel walls 74 and 76 at axially opposed sides thereof. A cam pin 78 is provided in the form of a bolt element which is threadably secured in a hole in the housing 30 to have an inward end thereof which is received within the angled groove 72. The opposite parallel walls 74, 76 of the angled groove 72 have an axial distance therebetween equal to an axial thickness of the extended end of the cam pin 78 plus the predetermined maximum distance for the running clearance C.

It should be clear that the clearance sensing ring 68 and the camming means 70 as thus described, should not be used to produce corresponding movement of the adjusting sleeve 56 at all times. If this were the case, clockwise movement of the clearance sensing ring 68 which would tend to move the piston 20 toward the disc 12 to reduce the running clearance would be followed by counter-clockwise movement which would tend to re-establish the excessive running clearance. Accordingly, the clearance sensing ring 68 is not directly mounted to the adjusting sleeve 56 and clutch means 80 is employed to control the manner in which rotational movement of the clearance sensing ring 68 is imparted to the adjusting sleeve 56. The clutch means 80 includes a clutch collar 82 which is mounted on the adjusting sleeve 56 for corresponding axial movement therewith. However, the clutch collar 82 is mounted between a shoulder 84 of the adjusting sleeve 56 and a snap ring 86 in a manner which will insure that a friction force is created between the clutch collar 82 and the adjusting ring 54 upon which it is mounted. Specifically, the preferred means for producing friction therebetween includes at least one spring or wave washer 88 which is axially entrapped and in a compressed condition to create the friction force between the adjusting sleeve 56 and the clutch collar 82 thereon. The reason for this force limiting coupling between the clutch collar 82 and the adjusting sleeve 56 rather than some form of rigid coupling will be discussed in detail hereinbelow.

Additionally, the clutch means 80 includes a one-way clutch feature which is preferably provided by a helical spring clutch 92 between the clutch collar 82 and the clearance sensing ring 68 mounted thereon. Specifically, as seen in FIG. 4, an end 94 of the helical spring clutch 92 is received within a notch 96 in the clearance sensing ring 68 to prevent its rotation relative thereto. The remaining portion of the helical spring clutch 92 extends around a cylindrical outer surface of the clutch collar 82 and is mounted in a manner well known in the art to insure that any rotation of the clearance sensing ring 68 in the clockwise direction will produce a corresponding rotation of the clutch collar 82. On the other hand, rotation of the clearance sensing ring 68, which is produced by the camming means 70, to cause it to rotate in a counter-clockwise direction, as viewed from the left in FIG. 2, will not produce a corresponding rotation of the clutch collar 82 and allow the clearance sensing ring 68 to be angularly repositioned thereon without producing any corresponding counter-clockwise rotation of either the clutch collar 82 or the adjusting sleeve 56. Mounting the clearance sensing ring 68 in this manner will insure that operation of the camming means 70 will only result in movement of the piston 20 to the left during operation of the brake 10 as the friction pads 26, 28 are worn to increase the running clearance C in excess of the predetermined maximum distance.

Although it is desirable for the clutch collar 82 to impart a corresponding rotation to the adjusting sleeve 56 in the manner described hereinabove, there are occasions when a fixed, rigid coupling therebetween would be undesirable and could damage one or more of the brake components. Specifically, as the piston 20 is adjusted forward for contact with the friction surface 24 of the disc 12 to provide a braking force thereto, the primary braking force is still being provided by the powershaft nut 48. As the powershaft nut 48 is being fully moved into axial position by the powershaft 46 to provide the primary braking force, there should not be a direct coupling between the camming means 70 and the adjusting sleeve 56. Accordingly, the force limiting feature of the clutch collar 82 will insure that primary braking force is not being provided by the camming means 70 and that any movement of the piston 20 during the creation of a braking force on the disc 12 will be primarily dictated by the axial movement of the powershaft nut 48.

As thus described, the preferred slack adjuster 54 will automatically adjust the running clearance C during operation of the brake after new friction pads 26, 28 are installed until they are in a worn condition for replacement. However, when the friction pads must be replaced, the adjusting sleeve 56 must be rotated in a counter-clockwise direction to retract the piston 20 but a means must be provided for accomplishing this rotation manually and for preventing any interference with such rotation which would exist during normal braking operation.

To provide for the manual slack adjustment of the brake 10, the preferred slack adjuster 54 utilizes a manual adjusting rod 102 which extends through an axial hole in the powershaft 46. Specifically, the rod 102 has an inward end thereof which supports the end portion 62 of the powershaft 46 and tends to maintain the end portion 62 rigidly thereon as a nut 104 is fully threaded on an exterior end 106 of the rod 102. However, when manual adjustment is desired, the nut 104 is unthreaded to be moved to the right as viewed in FIG. 2. When this is accomplished, the rod 102 can be extended inwardly within the powershaft 46 to cause the end portion 62 to removed to the left. The end portion 62 includes a toothed region 108 thereon which can be brought into alignment with and in engagement with a mating toothed region 109 about the inner surface of the adjusting sleeve 56. When the rod 102 is so positioned to the left, a tool may be employed on the working surfaces 110 thereof to cause rotation of the rod 102 independent of the powershaft 46. With the toothed regions 108, 109 engaged, rotation of the rod 102 will produce corresponding rotation of the adjusting sleeve 56. However, since the most significant reason for using this means for manual adjustment of the adjusting sleeve 56 includes rotation in a counter-clockwise direction to retract the piston 20, a means should be employed to prevent operation of the helical spring clutch 92. The cam pin 78 has been provided in the manner described to facilitate the elimination of camming between the housing 30 and the clearance sensing ring 68 during manual adjustment. Specifically, the cam pin 78 is unthreaded to be withdrawn from the angled groove 72 and to allow free rotation of the clearance sensing ring 68 within the housing 30 even though the adjusting sleeve 56 would still not tend to rotate in a counter-clockwise direction relative to the clearance sensing ring 68 itself.

After full retraction of the piston 20 in this manner, new friction pads 26, 28 can be installed. The manual adjusting rod 102 can then be used to produce clockwise rotation of the adjusting sleeve 56 until initial contact is made with the disc 12. After contact has been determined, the rod 102 can be slightly turned to produce an initial running clearance and to re-establish alignment of the groove 72 with the hole in the housing 30. In this position, the cam pin 78 can be reinstalled to provide the camming means 70 and re-establish the slack adjuster 54 to produce rotation of the adjusting sleeve 56 in the clockwise direction when needed.

Although the embodiment as described hereinabove is the preferred, any number of alterations could be made thereto without departing from the spirit of the invention as claimed.

I claim:

1. A slack adjuster for a disc brake of the type which includes a disc mounted for rotation about an axle, a brake housing mounted on said axle in alignment with a friction surface of said disc, a non-rotatable braking piston mounted in said housing for axial movement toward and away from said friction surface of said disc, brake actuation means mounted on said housing, a powershaft mounted within said housing co-axially aligned with said piston and capable of selective rotation by said brake actuation means, said powershaft having worm gear teeth thereon engaged with a powershaft nut within said housing which said powershaft nut is prevented from rotating and capable of axial movement directly corresponding to said selective rotation of said powershaft, said powershaft nut being operably connected to said piston to produce said axial movement thereof toward and away from said friction surface of said disc, said slack adjuster being utilized to maintain a running clearance between said piston and said friction surface of said disc at a predetermined maximum distance when said brake actuation means is not being actuated, said slack adjuster comprising:

an adjusting sleeve threadably coupled to said piston and being capable of rotation relative to said piston to adjust the axial position of said piston relative thereto, said adjusting sleeve being rotated in a first direction causing said piston to be adjusted toward said disc;

means for biasing said adjusting sleeve away from said disc to cause a rearward end thereof remote from said disc to be maintained in contact with a forward end of said powershaft nut to produce said axial movement thereof corresponding with said axial movement of said powershaft nut;

a clearance sensing ring mounted about said adjusting sleeve for said axial movement therewith;

camming means between said clearance sensing ring and said housing, said camming means causing said clearance sensing ring to rotate in said first direction when said axial movement of said adjusting sleeve toward said disc exceeds said predetermined maximum distance and in a second direction opposite from said first direction when said axial movement of said adjusting sleeve away from said disc exceeds said predetermined maximum distance; and clutch means between said clearance sensing ring and said adjusting sleeve producing corresponding rotation of said adjusting sleeve in said first direction until said piston contacts said friction surface of said disc to provide a braking force thereto and preventing corresponding rotation of said adjusting sleeve in said second direction.

2. The slack adjuster as set forth in claim 1, wherein said camming means includes an angled groove in an outer surface of said clearance sensing ring, a cam pin secured to said housing and extending inwardly to be received within said angled groove, and said angled groove having opposite parallel walls with an axial distance therebetween equal to an axial thickness of said pin plus said predetermined maximum distance.

3. The slack adjuster as set forth in claim 1, wherein said clutch means includes a clutch collar mounted on said adjusting sleeve with said clearance sensing ring mounted thereon, said clutch collar being capable of rotation relative to said adjusting sleeve and including friction means for applying a friction force to said adjusting sleeve to produce said corresponding rotation therebetween until said piston contacts said friction surface of said disc, and said clutch collar including a one-way clutch element coupled to said clearance sensing ring to cause said clearance sensing ring to produce rotation of said clutch collar only in said first direction.

4. The slack adjuster as set forth in claim 3, wherein said one-way clutch element includes a helical spring clutch.

* * * * *